United States Patent [19]

Maeda et al.

[11] Patent Number: 5,415,790

[45] Date of Patent: May 16, 1995

[54] THICKENING AGENT FOR TREATING TEXTILE MATERIAL

[75] Inventors: Hirokazu Maeda; Hitoshi Furuta; Taro Takahashi, all of Ibaraki; Toshihiro Nakamori, Osaka, all of Japan

[73] Assignee: Fuji Oil Co., Ltd., Osaka, Japan

[21] Appl. No.: 242,049

[22] Filed: May 13, 1994

Related U.S. Application Data

[63] Continuation of Ser. No. 28,414, Mar. 9, 1993, abandoned.

[30] Foreign Application Priority Data

Mar. 11, 1992 [JP] Japan ................... 4-088184

[51] Int. Cl.$^6$ ............... D06M 13/00; D06M 13/52

[52] U.S. Cl. ..................... 252/8.6; 252/8.7; 252/8.75; 252/8.8; 252/8.9

[58] Field of Search .................. 252/8.6–8.9

[56] References Cited

U.S. PATENT DOCUMENTS

| | | | |
|---|---|---|---|
| 2,709,699 | 5/1955 | Wolf et al. | 260/209 |
| 3,992,554 | 11/1976 | Blake et al. | 426/557 |
| 4,307,121 | 12/1981 | Thompson | 426/431 |
| 4,486,459 | 12/1984 | Thompson | 426/634 |
| 4,774,098 | 9/1988 | Gould et al. | 426/549 |
| 5,230,918 | 7/1993 | Anderson et al. | 426/572 |

*Primary Examiner*—Paul Lieberman
*Assistant Examiner*—Michael P. Tierney
*Attorney, Agent, or Firm*—Wallenstein & Wagner, Ltd.

[57] ABSTRACT

A thickening agent for treating textile material comprising water-soluble hemicellulose as its active ingredient.

3 Claims, No Drawings ent invention was thus completed based on these findings.

THICKENING AGENT FOR TREATING TEXTILE MATERIAL

This application is a Continuation of application Ser. No. 08/028,414, filed Mar. 9, 1993, now abandoned.

BACKGROUND OF THE INVENTION

1. Field of the Invention

This invention relates to a thickening agent for treating a textile material, and more particularly, to a thickening agent for treating a textile material comprising water-soluble hemicellulose as its active ingredient.

2. Description of the Related Art

In general, thickening agents for treating a textile material may include a size for working, a thickening agent for printing and a thickening agent for finishing. Starch-based thickening agents, such as corn starch, as well as PVA, CMC and sodium alginate, have been commonly used for the warping size. The thickening agent for printing is blended with various types of dyes and assistants for printing patterns and designs on textiles. Although a starch-based thickening agent, modified starch, CMC, sodium alginate and gua gum are commonly used for this thickening agent for printing, in addition to the agent itself being required to have permeability, washability, viscosity stability and coating strength, it is also required to provide adequate dyeing properties, clarity, dying uniformity and sharpness to the dyed material.

In addition, the thickening agent for finishing is used for the purpose of increasing the product value of textiles. Finishing includes stain-preventing finishing, waterproofing finishing and flame retardant finishing and so forth, and a starch-based thickening agent, modified starch, CMC, PVA, sodium alginate and so on are commonly used for this type of thickening agent as well.

As can be understood from the above, the types of thickening agents are quite diverse. There are very few cases in which only one type of thickening agent is used, and normally, a mixture of these types of thickening agents is used.

As described above, although the thickening agent itself used in printing of textiles is required to have permeability, washability, viscosity stability and coating strength during drying, as well as demonstrating adequate dyeing properties, clarity, dyeing uniformity and sharpness on the dyed material, the present state of this thickening agent is such that it is not always able to satisfy all of these requirements.

In addition, in finishing performed within a pad and padding dyeing as well, in addition to suitable dyeing properties, processing uniformity and dyeing uniformity, this thickening agent is required to have suitable viscosity as well as dispersibility for a dye and assistant. In particular, in the case of performing finishing within a pad, the thickening agent of the prior art has the problem of causing migration of dye and processing reagents in the drying process.

SUMMARY OF THE INVENTION

As a result of earnest research on the part of the inventors of the present invention in consideration of the above-mentioned points, it was found that water-soluble hemicellulose demonstrates excellent dyeing properties, clarity, dyeing uniformity and sharpness when used in printing, and in particular, that in the case of use in finishing performed within a pad as well as padding dyeing, water-soluble hemicellulose prevents migration while also allowing the obtaining of favorable processing uniformity and dyeing uniformity. The present invention was thus completed based on these findings.

Thus, the present invention is a thickening agent for treating a textile material comprising water-soluble hemicellulose as its active ingredient.

DESCRIPTION OF THE PREFERRED EMBODIMENTS

The thickening agent for treating a textile material of the present invention includes all thickening agents that are used in the processing of textile materials, while the processing of the textile materials includes the entire range of processing from warping, scouring and bleaching to dyeing and finishing.

The water-soluble hemicellulose usable for the present invention is of plant origin, particularly that of oily seeds and grain, and preferably from beans, and soybeans in particular, preferably of cotyledon-origin.

Although water-soluble hemicellulose can be used regardless of its molecular weight, it preferably has a weight average molecular weight of several ten thousand to several million, and specifically, a weight average molecular weight of 50,000 to 1,000,000 is preferable. Furthermore, this weight average molecular weight of water-soluble hemicellulose is the value determined by the limiting viscosity method wherein the viscosity in a 0.1M solution of $NaNO_3$ is measured using standard pluran (sold by Showa Denko K. K.) for the standard substance. In addition, measurement of uronic acid was performed according to the Blumenkrantz method, and measurement of neutral sugars was performed by GLC after alditol acetylation.

Water-soluble hemicellulose can be obtained by extracting a raw material containing hemicellulose with water or, depending on the case, either eluting by heating under acid or alkaline conditions or eluting by decomposing with oxygen. The following indicates one example of a process for manufacturing water-soluble hemicellulose.

Examples of plants that can be used for the raw material include husks of oily seeds, such as soybeans, palm, coconut, corn and cottonseeds, from which oils and proteins are normally removed, and residues of grains, such as rice and wheat, from which starch is normally removed. If soybeans are used for the raw material, bean curd residue can be used for the raw material, which is a byproduct of the manufacturing of soybean curd, soybean milk and separated soybean protein.

After heating to decompose these raw materials under acid to alkaline conditions, preferably at a pH in the vicinity of the isoelectric point of each protein, and preferably at 130° C. or lower and 80° C. or higher, and more preferably at 130° C. or lower and 100° C. or higher, and fractioning into water-soluble fractions, water-soluble hemicellulose is obtained by either drying as is, or, for example, by drying after removing hydrophobic substances or low molecular weight substances by activated charcoal treatment, resin adsorption treatment or ethanol precipitation treatment.

In the present invention, although water-soluble hemicellulose prevents migration and possesses excellent processing uniformity and dyeing uniformity in the case of using water-soluble hemicellulose alone for the glue for a textile material-treating thickening agent, since there are cases wherein the viscosity may be inadequate when used as a printing thickening agent, it is preferable to use the water-soluble hemicellulose in combination with a conventional textile material-treating thickening agent.

A conventional textile material-treating thickening agent that is used most commonly is starch, a representative example of which is corn starch. Other examples of naturally-occurring thickening agents include sodium alginate, gloiopeltis glue, agar, gum tragacanth, gua gum, locust bean gum, gum arabic and natural glue. Examples of semi-synthetic thickening agents include carboxymethylcellulose (CMC), methylcellulose (MC), hydroxyethylcellulose (HEC) and modified starches typically represented by soluble starch. In addition, examples of synthetic thickening agents include polyvinylalcohol and sodium polyacrylate.

The effectiveness of the water-soluble hemicellulose in the present invention is further improved by using it in combination with one or more types of the above-mentioned thickening agents.

Although the following examples provide an explanation of the present invention through its embodiments, these examples are merely embodiments of the present invention and as such, the scope of the present invention is not limited by these examples. Furthermore, indications of parts or % both refer to weight standards.

PREPARATION OF SOYBEAN HEMICELLULOSE

Two volumes of water were added to raw bean curd residue, obtained in the process of manufacturing separated soybean protein, followed by adjusting the pH to 4.5 with hydrochloric acid and hydrolyzing for 1.5 hours at 120° C. After cooling, the mixture was centrifuged (10000 G×30 minutes) to separate the supernatant from the precipitate. The precipitated portion separated in this manner was then washed with an equal amount of water. After again centrifuging to separate the mixture, the supernatant was combined with the previous supernatant followed by activated charcoal treatment. Following this treatment, the solution was dried to obtain water-soluble hemicellulose (a).

Moreover, after dissolving this water-soluble hemicellulose in 0.5% brine, the solution was reprecipitated three times so that the ethanol concentration became 50%. Demineralization was then performed by using an ion exchange resin (Organo Co., Ltd., "Amberlite IR-120B") to obtain water-soluble hemicellulose (b).

On the other hand, water-soluble hemicellulose (c) was obtained in a similar manner with the exception of not performing active charcoal treatment in the above-mentioned process.

The above results are summarized as indicated below.

| Ingredient | Proportions (%) | | |
|---|---|---|---|
| | (a) | (b) | (c) |
| Water | 5.71 | 7.75 | 5.10 |
| Crude Protein | 1.93 | 1.03 | 5.43 |
| Crude Ash | 5.29 | 0.22 | 5.30 |
| Polysaccharides | 87.07 | 91.00 | 84.17 |
| Weight Average molecular Weight | 178,000 | 207,000 | 114,000 |

Next, the sugar compositions of the water-soluble hemicelluloses of (a), (b) and (c) were analyzed by the following method. Measurement of uronic acid was performed according to the Blumenkrantz method, while neutral sugars were measured using GLC according to the alditol acetate method.

Those results are as indicated below.

| Type of Sugar | Sugar Composition (% by weight) | | |
|---|---|---|---|
| | (a) | (b) | (c) |
| Uronic acid | 20.4 | 16.9 | 19.4 |
| Rhamnose | 1.6 | 2.7 | 2.1 |
| Fucose | 2.7 | 5.2 | 3.9 |
| Arabinose | 19.9 | 19.2 | 23.1 |
| Xylose | 6.4 | 8.4 | 5.8 |
| Galactose | 47.3 | 46.8 | 43.4 |
| Glucose | 1.8 | 0.9 | 2.3 |

EXAMPLE 1

Printing Test 10 parts of water-soluble soybean hemicellulose (a) and 2.5 parts of sodium alginate (Snow Algin CP-300, Fuji Chemical Co., Ltd.) were dissolved in hot water to bring to a final volume of 100 parts to fabricate a thickening agent. After cooling to normal temperature, 2 parts of disperse dye (Disperse Yellow 42) and 28 parts of water were added to 70 parts of this thickening agent to prepare a printing paste. Next, a pattern mesh was placed on a fabric of polyethylene glycol terephthalate, and various types of disperse dye-containing printing paste were uniformly printed onto the fabric. Next, after drying with hot air, fixing was performed for 3 minutes at 100% humidity and 75° C. Following completion of fixing, the printed fabric was immersed in an aqueous solution of sodium hydrosulfite (0.2% solution) and sodium hydroxide (0.2% solution) at 80° C. for 10 minutes followed by final washing with water. After drying with an iron, observation of the degree of dyeing revealed dyeing properties, clarity, dyeing uniformity and sharpness to be extremely favorable, while the falling-off property of the thickening agent and the viscosity of the paste were also observed to be extremely favorable.

EXAMPLE 2

When a printing testing was performed in exactly the same manner as Example 1 with the exception of using 20 parts of water-soluble soybean hemicellulose (b) instead of 10 parts of water-soluble soybean hemicellulose (a) and 2.5 parts of sodium alginate in Example 1, dyeing properties, clarity, dyeing uniformity and thickening agent-falling-off property were observed to be extremely favorable, while the sharpness of the printing and the viscosity of the paste were also favorable.

EXAMPLE 3

Printing testing was performed in exactly the same manner as Example 1 with the exception of using 10 parts of water-soluble soybean hemicellulose (c) and 10 parts of Mayplo Gum NP instead of 10 parts of water-soluble soybean hemicellulose (a) and 2.5 parts of sodium alginate in Example 1. As a result, dyeing properties, clarity, dyeing uniformity, sharpness, thickening agent-falling-off property and paste viscosity were all observed to be extremely favorable similar to the results of Example 1.

COMPARATIVE EXAMPLE 1

When printing testing was performed in exactly the same manner as Example 1 with the exception of using 5.0 parts of sodium alginate instead of 10 parts of water-soluble soybean hemicellulose (a) and 2.5 parts of sodium alginate as in Example 1, the results were somewhat inferior in contrast to the results of Example 1 with respect to dyeing properties and clarity being extremely superior. This suggested that combined use of water-soluble hemicellulose with a conventional thickening agent is effective.

COMPARATIVE EXAMPLE 2

When printing testing was performed in exactly the same manner as Example 1 with the exception of using 20 parts Mayplo Gum NP instead of 10 parts of water-soluble soybean hemicellulose (a) and 2.5 parts of sodium alginate as in Example 1, dyeing properties were observed to be somewhat inferior in comparison with the results of Example 1, and clarity was observed to be somewhat poor.

COMPARATIVE EXAMPLE 3

When printing testing was performed in exactly the same manner as Example 1 with the exception of using 10 parts of carboxymethylcellulose instead of 10 parts of water-soluble soybean hemicellulose (a) and 2.5 parts of sodium alginate as in Example 1, both dyeing properties and clarity were somewhat poor.

COMPARATIVE EXAMPLE 4

Dyeing testing was performed in exactly the same manner as Example 1 with the exception of using 15 parts of wheat starch instead of 10 parts of water-soluble soybean hemicellulose (a) and 2.5 parts of sodium alginate as in Example 1, and boiling for 30 minutes. As a result, dyeing properties, clarity, dyeing uniformity and thickening agent-falling-off property were also observed to be somewhat poor.

The above results in Examples 1–3 and Comparative Examples 1–4 are summarized below.

| Examples and Comparative Examples | Dyeing Properties | Clarity | Dyeing Uniformity | Sharpness | Thickening agent-falling-off property | Paste Viscosity |
|---|---|---|---|---|---|---|
| Example 1 | ○ | ○ | ○ | ○ | ○ | ○ |
| Example 2 | ○ | ○ | ○ | Δ | ○ | Δ |
| Example 3 | ○ | ○ | ○ | ○ | ○ | ○ |
| Comparative Example 1 | Δ | Δ | ○ | ○ | ○ | ○ |
| Comparative Example 2 | Δ | X | ○ | ○ | ○ | ○ |
| Comparative Example 3 | X | X | ○ | Δ | ○ | ○ |
| Comparative Example 4 | X | X | X | Δ | X | ○ |

Symbols
○: Extremely favorable
Δ: Favorable
X: Somewhat poor

As indicated in the above table, printing can be performed with excellent results in dyeing properties, clarity, dyeing uniformity and thickening agent-falling-off property in the case of using water-soluble hemicellulose. In addition, the shortcomings of conventional thickening agents can be overcome by combining said water-soluble hemicellulose with said conventional thickening agents.

EXAMPLE 4

Padding dyeing was performed on a fabric for a seat belt comprised of polyethylene glycol terephthalate.

3 parts of a liquid preparation of commercially available Disperse Blue 148 and 3 parts of water-soluble soybean hemicellulose (a) were dissolved in water to bring to a final volume of 100 parts. Next, the fabric was immersed in a pad bath in accordance with conventional method followed by padding dyeing. The padded fabric was dried and steamed for 20 minutes and applying pressure of 1.5 bar. Next, the fabric was washed with water, and then washed for 10 minutes at 90° C. in water while adding a 0.1% solution containing an EO 20 mol adduct of nonylphenol. After drying, a colored belt fabric was obtained having a dark blue color of a favorable shade.

EXAMPLE 5

When the entire process described in Example 4 was performed in the same manner as Example 4 with the exception of using water-soluble soybean hemicellulose (b) instead of water-soluble soybean hemicellulose (a), both dyeing properties and clarity were observed to be excellent, while uneven dyeing during drying was essentially not observed.

EXAMPLE 6

When the entire process described in Example 4 was performed in the same manner as Example 4 with the exception of using 5 parts of water-soluble soybean hemicellulose (c) instead of 3 parts of water-soluble soybean hemicellulose (a), both dyeing properties and clarity were observed to be excellent as in Examples 4 and 5, while uneven dyeing during drying was essentially not observed.

COMPARATIVE EXAMPLE 5

When the entire process described in Example 4 was performed in the same manner as Example 4 with the exception of using sodium alginate instead of water-soluble soybean hemicellulose (a), dyeing uniformity was observed to be inferior.

COMPARATIVE EXAMPLE 6

When the entire process described in Example 4 was performed in the same manner as Example 4 with the exception of using sodium acrylate instead of water-soluble soybean hemicellulose (a), dyeing uniformity was observed to be inferior.

Excellent effects of dyeing properties, clarity, dyeing uniformity and sharpness were obtained when water-soluble hemicellulose is used for printing. In the case of use for finishing performed in a pad and padding dyeing in particular, migration was prevented and favorable processing uniformity and dyeing uniformity were obtained. Thus, the present invention allows the obtaining of a thickening agent for treating textile material exhibiting excellent dyeing properties, dyeing uniformity and processing uniformity.

We claim:

1. A process for treating a textile material comprising the steps of:

applying a thickening agent comprising water-soluble soybean hemicellulose; and, fixing the applied thickening agent to the textile material.

2. The process for treating a textile material of claim 1 wherein applying the thickening agent includes uniform printing onto the textile material.

3. The process for treating a textile material of claim 1 wherein the step of fixing includes drying the thickening agent onto the textile material with heat.

* * * * *